(12) United States Patent
Sumiuchi

(10) Patent No.: US 7,317,552 B2
(45) Date of Patent: Jan. 8, 2008

(54) PRINT DATA FORMING APPARATUS, PRINT DATA FORMING METHOD, AND COMPUTER-READABLE PROGRAM

(75) Inventor: Kazuyoshi Sumiuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 952 days.

(21) Appl. No.: 10/443,919

(22) Filed: May 23, 2003

(65) Prior Publication Data

US 2003/0231322 A1 Dec. 18, 2003

(30) Foreign Application Priority Data

May 31, 2002 (JP) .............................. 2002-159739
May 6, 2003 (JP) .............................. 2003-127993

(51) Int. Cl.
*G06F 15/00* (2006.01)
*B41F 1/00* (2006.01)

(52) U.S. Cl. ...................... 358/1.2; 358/1.18; 358/451; 358/452; 358/453; 382/295

(58) Field of Classification Search ................. 358/1.2, 358/1.18, 1.15, 450, 448, 451, 452, 453; 382/256, 293, 295

See application file for complete search history.

(56) References Cited

U.S. PATENT DOCUMENTS

| | | | | |
|---|---|---|---|---|
| 4,907,095 | A | * | 3/1990 | Komura et al. ............ 358/451 |
| 6,175,839 | B1 | * | 1/2001 | Takao et al. ............... 715/500 |
| 2003/0095269 | A1 | * | 5/2003 | Kubo et al. ................. 358/1.9 |
| 2003/0202211 | A1 | * | 10/2003 | Yudasaka et al. .......... 358/1.18 |
| 2006/0114529 | A1 | * | 6/2006 | Oh ............................. 358/1.2 |

* cited by examiner

*Primary Examiner*—Kimberly A. Williams
(74) *Attorney, Agent, or Firm*—Fitzpatrick, Cella, Harper & Scinto

(57) ABSTRACT

A center position designated for an image is inputted and print data which is printed is formed so that the image is printed lest a blank occurs on a sheet and the center position designated for the inputted image is located at the center of the sheet, so that a borderless printing subjected to a trimming process can be performed by simple designation.

12 Claims, 7 Drawing Sheets

PRINT DATA FORMING APPARATUS, PRINT DATA FORMING METHOD, AND COMPUTER-READABLE PROGRAM

BACKGROUND OF THE INVENTION

1. Field of the Invention

The invention relates to a print data forming apparatus for forming print data, a print data forming method, and a computer-readable program and, more particularly, to a print filter serving as a program for converting image data or the like by a command line operation and forming print data of a color printer on a terminal of an OS (Operating System) of the UNIX system such as Linux or the like.

2. Related Background Art

In recent years, in addition to commercially available OSs such as Windows of Microsoft Corporation in U.S.A., MacOS of Apple Computer Incorporation in U.S.A., and the like, share of Linux serving as a free OS of the UNIX system has been increasing. In such a situation, printer vendors are starting to release a print filter which plays a role of a printer driver in Linux. As shown in FIG. 1, the print filter is a program for converting bit map image data such as TIFF file, JPEG file, and the like into print data of a printer. On a terminal of a text base, for example, the user makes setting upon printing as follows by an option of a command line and performs a print.

In the case of printing photo.tif by setting of plain paper.
printfilter—model printermodel—media plain photo.tif>/dev/lp0

The recent print filter has a borderless printing function or the like which has been realized by a printer driver for Windows and advancement of functions has been realized. As shown in FIG. 2, the "borderless printing" is realized by a method whereby a print area of a printer is designated so as to be larger than a sheet size, image data is enlarged or reduced so as to be fitted to the print area, and a print is performed.

However, when an aspect ratio of the sheet is different from that of the image data as shown in FIG. 3, if the image data is fitted to the print area, a blank occurs and a desired print result cannot be obtained. In such a case, as shown in FIG. 4, it is required for the user to perform a trimming process so as to extract a portion to be printed from the image data in accordance with the aspect ratio of the sheet by using an application, a tool, or the like before printing an image.

SUMMARY OF THE INVENTION

The invention is made in consideration of the conventional example and it is an object of the invention to execute a borderless printing subjected to a trimming process by simple designation.

To accomplish the above object, according to the invention, there is provided a print data forming apparatus comprising:

input means for inputting a center position designated for an image; and forming means for forming print data which is printed in a manner such that the image is printed so as not to cause a blank on a sheet and the center position which has been inputted by the input means and designated for the image is located at a center of the sheet.

DETAILED DESCRIPTION OF THE PREFERRED EMBODIMENT

An example of a print filter in an embodiment according to the invention will be described in detail hereinbelow with reference to the drawings.

Figure 1:
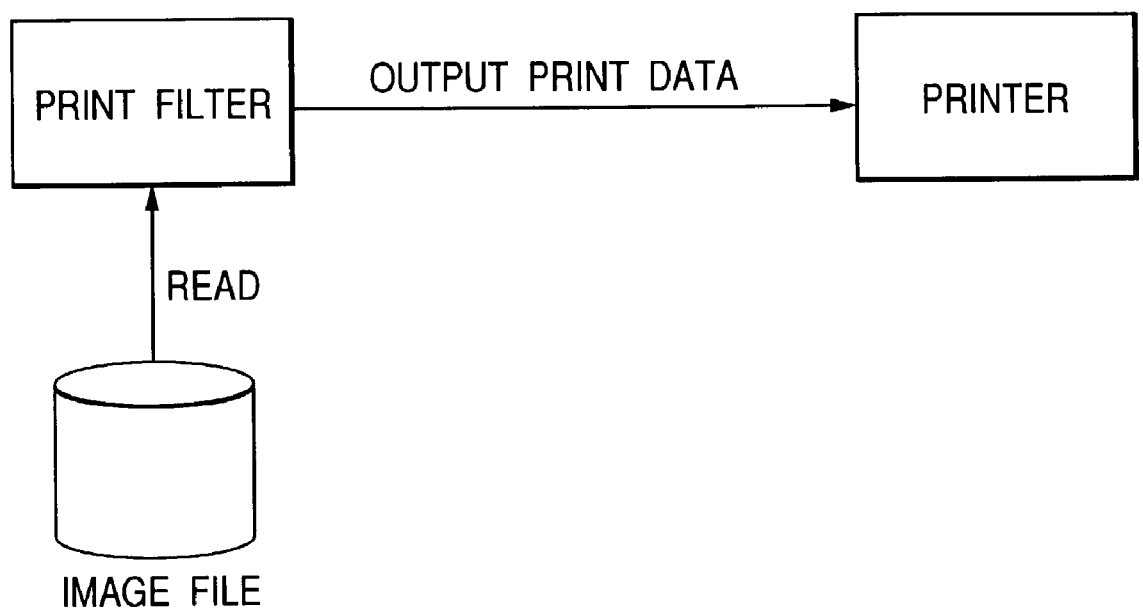
FIG. 1 is a diagram for explaining a general print filter.
Figure 2:
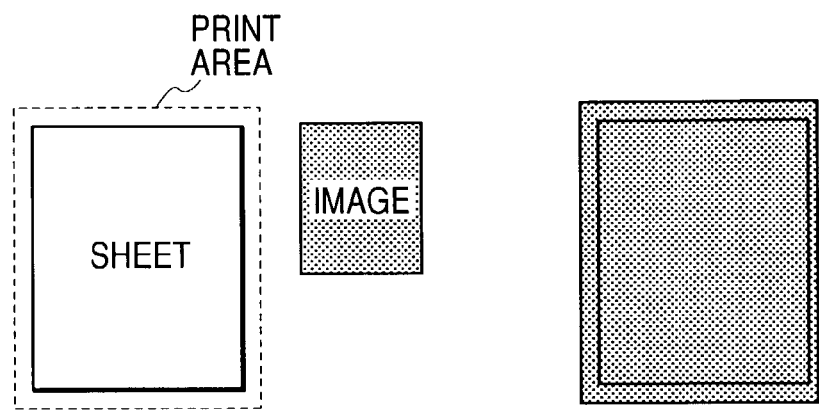
FIG. 2 is a diagram for explaining a borderless printing.
Figure 3:
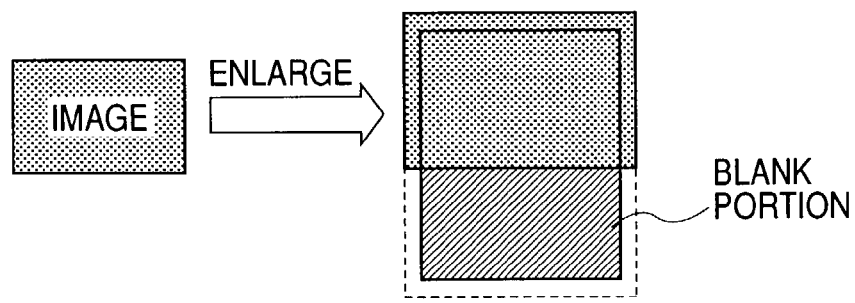
FIG. 3 is a diagram for explaining an example in which a blank occurs upon borderless printing.
Figure 4:
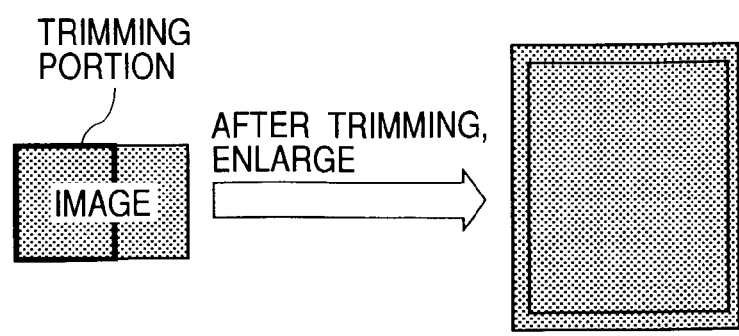
FIG. 4 is a diagram for explaining an example in which a trimming process is executed so as not to cause a blank upon borderless printing.
Figure 5:
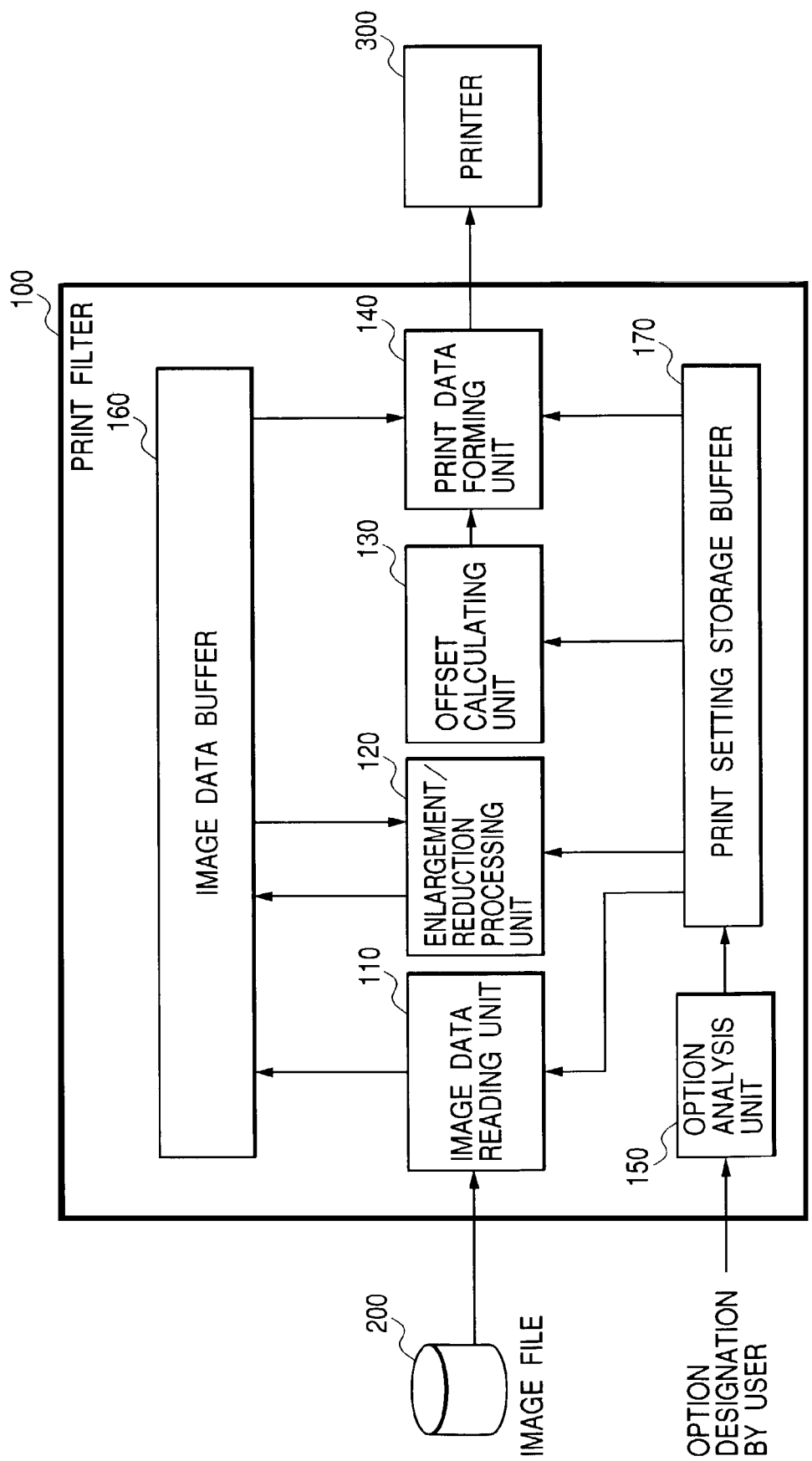
FIG. 5 is a schematic diagram showing an example of a construction of a print filter according to the invention.

FIG. 5 shows a constructional diagram of the print filter (program) according to the invention. To a print filter 100, a file name of an image file 200 and print settings such as type of sheet, size, and the like are instructed as command line options by the user. In the print filter 100, the designated image file is read and print data according to the print settings is formed. The user can print by transmitting the formed print data to a printer.

In the case of performing a borderless printing, print settings of "borderless print designation" and "Full & center position coordinates designation" are received as command line options by the user.

The Full & center position coordinates will now be described with reference to FIG. 6. "Full process" is a process for enlarging or reducing a size of image data so as to eliminate a blank in a print area while holding an aspect ratio of original image data. As center position coordinates, coordinates of original image data to be moved are designated to a center of the print area. When the aspect ratio of the original image data differs from that of the print area, if the Full process is executed, the enlarged or reduced image data overflows the print area. Therefore, the user is made to designate a portion which he wants to include into the print area. For example, when the user wants to perform the borderless printing by cutting out an image around a human body, as a center, in the original image data in FIG. 6 a desired borderless printing can be realized by designating the Full process and the center position coordinates (300, 100).

Subsequently, a flow of processes in the case where the print settings of "borderless print designation" and "Full & center position coordinates designation" are actually designated by the user will be described with reference to FIG. 5.

In the print filter 100, designated option information is stored into a print setting storage buffer 170 by an option analysis unit 150 for analyzing an option designated by the user. Besides print settings such as type of sheet, size of sheet, and the like designated by a command line and the file name of the image file, a printer resolution, print area information, and the like in a designated print mode are also stored in the option information.

An image data reading unit 110 obtains the file name of the image file designated by the user from the print setting storage buffer 170 and reads out the image data from the image file 200. The read image data is stored into an image data buffer 160.

Subsequently, when "Full & center position coordinates designation" is designated, the Full process is executed first. In the Full process, since an enlarging/reducing process (also referred to as a zooming process hereinbelow) is executed, an enlargement or reduction ratio (also referred to as a zoom ratio hereinbelow) is calculated and an enlarging or reducing process is executed in an enlargement/reduction processing unit 120. In the enlargement/reduction processing unit 120, the number of pixels in the print area and the number of pixels of the image data are obtained from the image data buffer 160 and the print setting storage buffer 170. Subsequently, the number of pixels in a printer resolution of the print area is assumed to be Px pixels in the landscape direction and Py pixels in the portrait direction, the number of pixels of the original image data is assumed to be Dx pixels in the landscape direction and Dy pixels in the portrait direction, and a zoom ratio a in the Full process is calculated by the following equation (1).

$$\alpha = \max(\alpha x, \alpha y) \tag{1}$$

where, $\alpha x = Px/Dx$, $\alpha y = Py/Dy$

Since Px and Py indicate the numbers of pixels in the printer resolution and Dx and Dy indicate the numbers of pixels in the resolution of the original image data, respectively, a resolution converting process for converting from the resolution of the original image data into the resolution of the printer can be executed simultaneously with the execution of the Full process.

In the enlargement/reduction processing unit 120, the enlarging or reducing process is executed on the basis of the calculated zoom ratio α and a processing result is stored into the image data buffer 160.

Subsequently, in an offset calculating unit 130, offset coordinates are calculated with respect to the image data which has been enlarged or reduced by the Full process. The offset coordinates are coordinates from which creation of print data is started. By calculating the offset coordinates and deciding a range to form the print data from the reduced image data, a process equivalent to a trimming process can be realized.

In the offset calculating unit 130, to which one of the landscape direction (x direction) and the portrait direction (y direction) the image is shifted is determined in accordance with values of αx and αy in the equation (1).

First, a case of $\alpha x \leq \alpha y$ will be described. In this case, the offset coordinate is calculated only in the x direction (the offset coordinate in the y direction is equal to 0). Assuming that the coordinates of the center position designated by the user are set to (Cx, Cy), since Cx and Cy indicate the numbers of pixels in the resolution of the original image data, a unit of each number of pixels can be matched with the resolution of the printer by the following equations (2) and (3).

$$Dx' = Dx \times \alpha \tag{2}$$

$$Cx' = Cx \times \alpha \tag{3}$$

If the center position coordinates designated by the user are applied as they are, there is a case where a blank occurs. For example, if an origin of the image data is designated as center position coordinates, the print data is printed to only the right half portion or the upper half portion of the print area, so that a blank occurs. In such a case, the center position coordinates designated by the user are not applied as they are but Cx' which does not cause a blank is calculated by the following equation (4).

$$\text{if } ((Dx'-Cx')<Px/2) Cx'=Dx'-Px/2 \tag{4}$$

where, Px, Py: the numbers of pixels in the printer resolution of the print area mentioned above Thus, an offset coordinate Ox in the x direction is calculated by the following equation (5).

$$Ox = Cx' - Px/2 \tag{5}$$

When αx>αy, the image is offset only in the y direction (the offset coordinate in the x direction is equal to 0) and an offset coordinate Oy in the y direction is calculated by the following equations (6) to (9).

$$Dy' = Dy \times \alpha \tag{6}$$

$$Cy' = Cy \times \alpha \tag{7}$$

$$\text{if } ((Dy'-Cy')<Py/2) Cy'=Dy'-Py/2 \tag{8}$$

$$Oy = Cy' - Py/2 \tag{9}$$

Subsequently, a print data forming unit 140 forms print data on the basis of the offset coordinates calculated by the offset calculating unit 130, the image data stored in the image data buffer 160, and various information stored in a print setting storage buffer 170. In the print data forming unit 140, the creation of the print data is started from the offset coordinates and processes are executed to the data of an amount of Px pixels in the x direction and the data of an amount of Py pixels in the y direction as targets, so that the print data in which no blank occurs in the print area can be formed.

A processing flow in the case where the print settings of "borderless print designation" and "Full & center position coordinates designation" have been designated by the user will now be described with reference to a flowchart of FIG. 10. To simplify the flowchart, explanation will be made on the assumption that processes regarding the option analysis unit 150 according to the command line designation by the user are omitted and the print settings of "borderless print designation" and "Full & center position coordinates designation" have been designated by the user. A program regarding the flowchart of FIG. 10 has been stored in a memory of a computer and is executed by a CPU of the computer.

First, the zoom ratio α which is obtained by the equation (1) is calculated in step S100. Subsequently, the offset amounts Ox and Oy which are obtained by the equations (2) to (9) are calculated in step S110. Since "Full designation" has been made by the user with respect to the values of the offset amounts Ox and Oy, one of Ox and Oy is equal to 0 as already explained in conjunction with the equations (1) to (9).

Since the print data is formed on a 1-raster unit basis in the portrait direction (y direction), a coordinate value in the portrait direction of a process target raster in the original image is defined as Y. In step S120, by setting an initial value of Y to Oy obtained in step S110, a head of the process target raster is moved to a raster at which the creation of the print data is started.

In next step S130, the image data of the Yth raster is read out from the original image. In step S140, the image data of an amount of one raster which has been read is enlarged or reduced in the landscape direction (x direction) on the basis of the zoom ratio a obtained in step S100. Subsequently, in a manner similar to the case where the offset amount Oy is applied to the y direction in step S120, in step S150, the offset amount Ox is applied to the x direction, the pixel of the coordinate Ox in the x direction is set to the head pixel of the processing target, and the print data is formed in correspondence to the Px pixels as the number of pixels in the x direction in the printer resolution of the print area. The print data formed as mentioned above is transmitted to the printer in step S160.

Subsequently, whether the image data of an amount corresponding to the rasters to form the print data has been finished or not, that is, whether the print data of an amount corresponding to the Py rasters as the number of pixels in the y direction in the printer resolution of the print area has been formed or not is discriminated in step S170. If the image data has been finished, the processing flow is finished at this point of time. If the image data to be processed still remains, the coordinates values of the next processing target raster are calculated on the basis of the zoom ratio a and the value of Y is updated in step S180.

How the value of Y changes in step S180 will be explained with respect to specific examples. A case where $\alpha \geq 1$, that is, the enlarging process is executed will be explained with respect to an example in which $\alpha=2$. A case where $\alpha<1$, that is, the reducing process is executed will be explained with respect to an example in which $\alpha=\frac{1}{2}$.

When $\alpha=2$, since the enlarging process of 2 times is executed, it is sufficient to form the print data twice for the original image of one raster. In step S180, therefore, the value of Y is not changed in the 2n-th process but is updated to Y=Y+1 in the (2n+1)th process.

When $\alpha=\frac{1}{2}$, since the reducing process of ½ time is executed, it is sufficient to form the print data every other raster. In step S180, the value of Y is updated to Y=Y+2 every time and the creation of the print data of an amount of one raster of the original image data is skipped.

Subsequently, whether the value of Y has been changed or not is discriminated in step S190. If the value of Y has been changed, the processing routine is repeated from step S130 in order to read the new image data of one raster. If the value of Y is not changed, the processing routine is repeated from step S150 in order to execute the print data forming process to the image data used previously.

At timing when the print data of an amount of Py rasters has been formed and transmitted to the printer as mentioned above, whether the processes are finished or not is discriminated in step S170 and the processing routine is finished.

Figure 6:
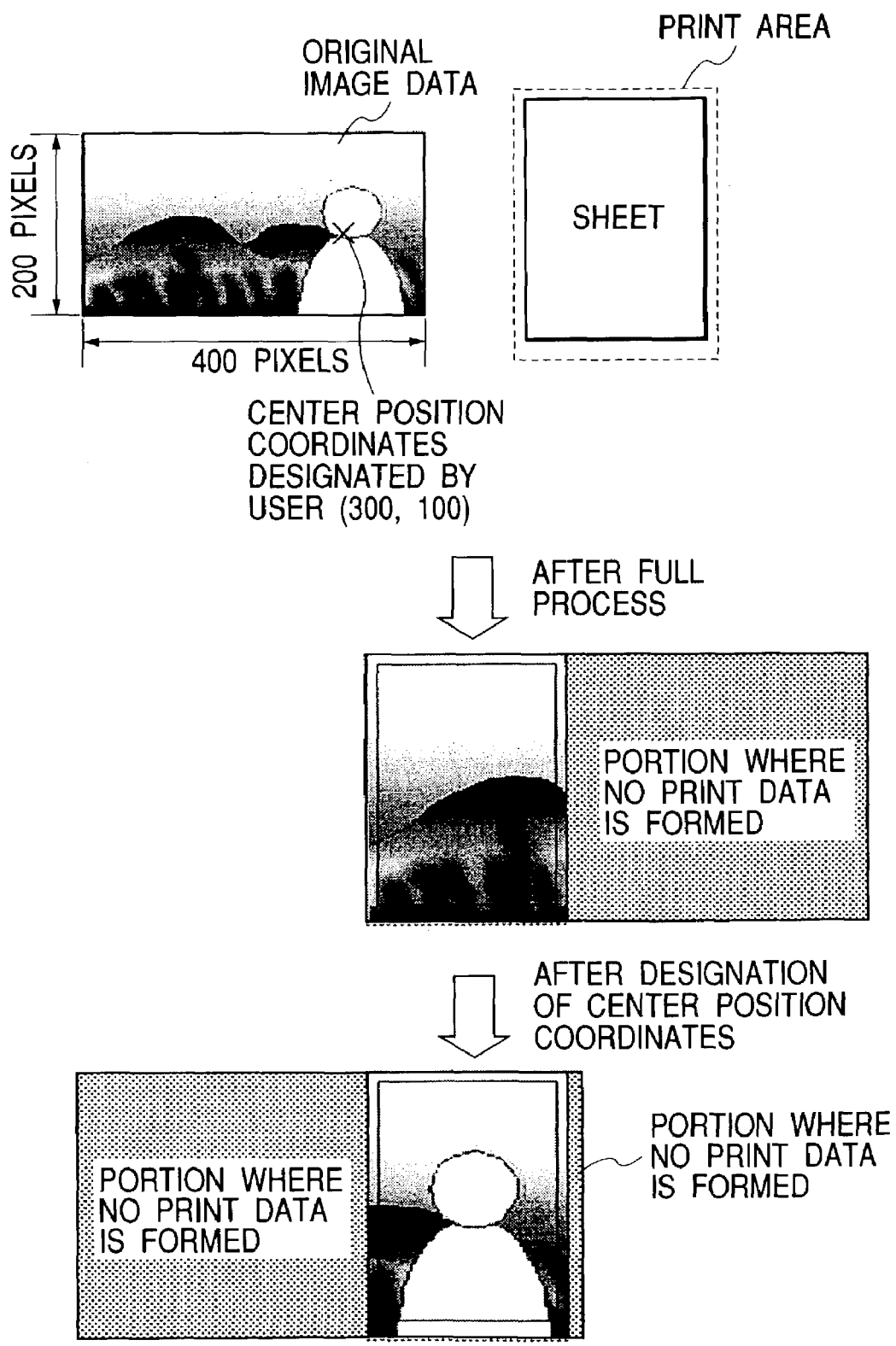
FIG. 6 is a diagram for explaining a Full process and designation of center position coordinates.

Although the example in which after the original image is enlarged or reduced, the offset is calculated and the print data is formed has been explained in the embodiment, the invention can be realized by a method whereby a size of print area is zoomed so as to be matched with the portrait or landscape size of the original image (zoomed so as to be matched with the portrait size in the example of FIG. 6), the original image is cut out in the zoomed size of print area, and the cut-out original image is zoomed so as to be matched with the print area.

An example in which a range of the print data which is formed differs depending on the values of the center position coordinates will now be specifically explained with reference to the drawings.

Figure 7:
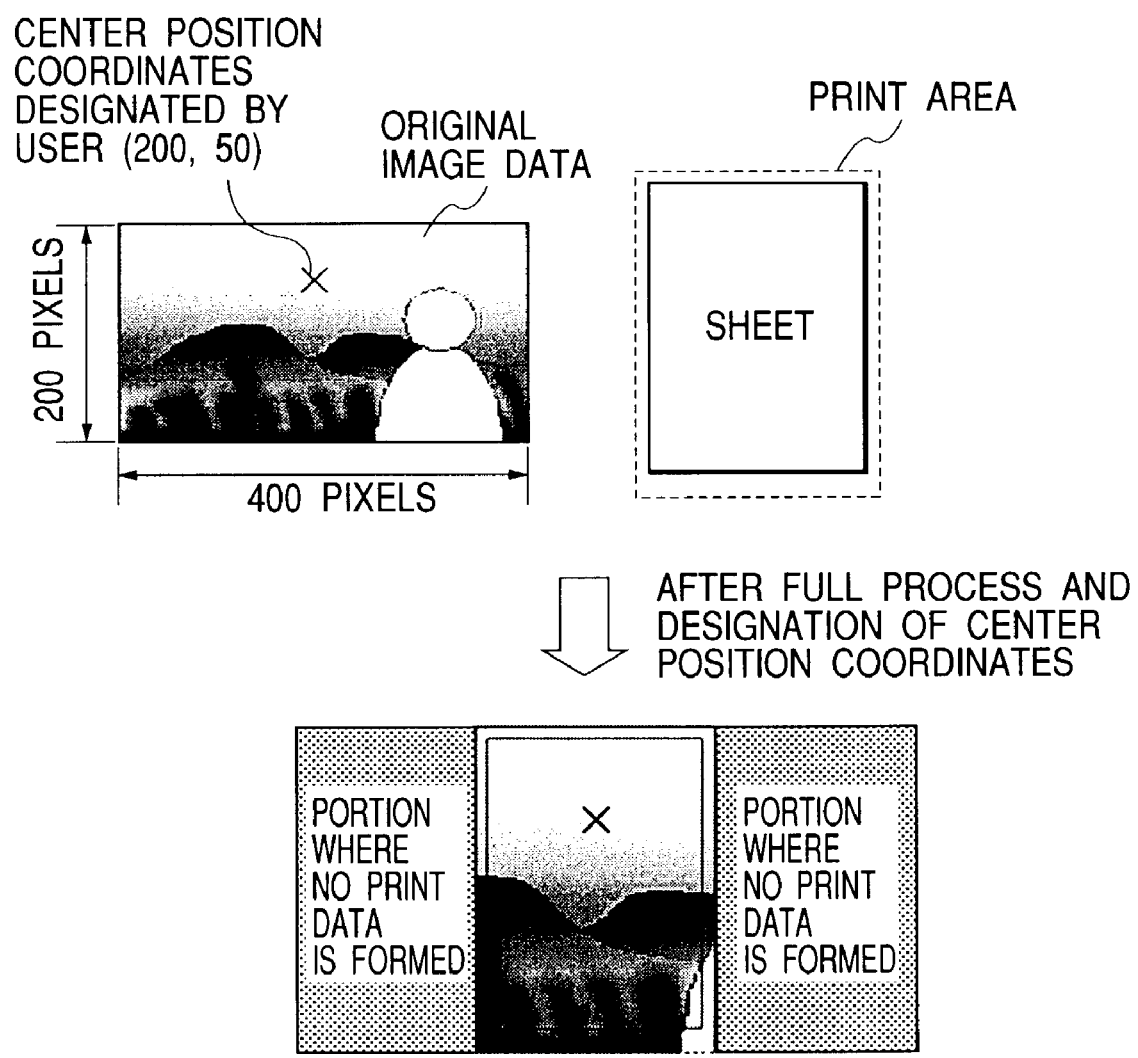
FIG. 7 is a diagram for explaining a case where the center position coordinates are designated so as not to cause a blank on a sheet.
Figure 8:
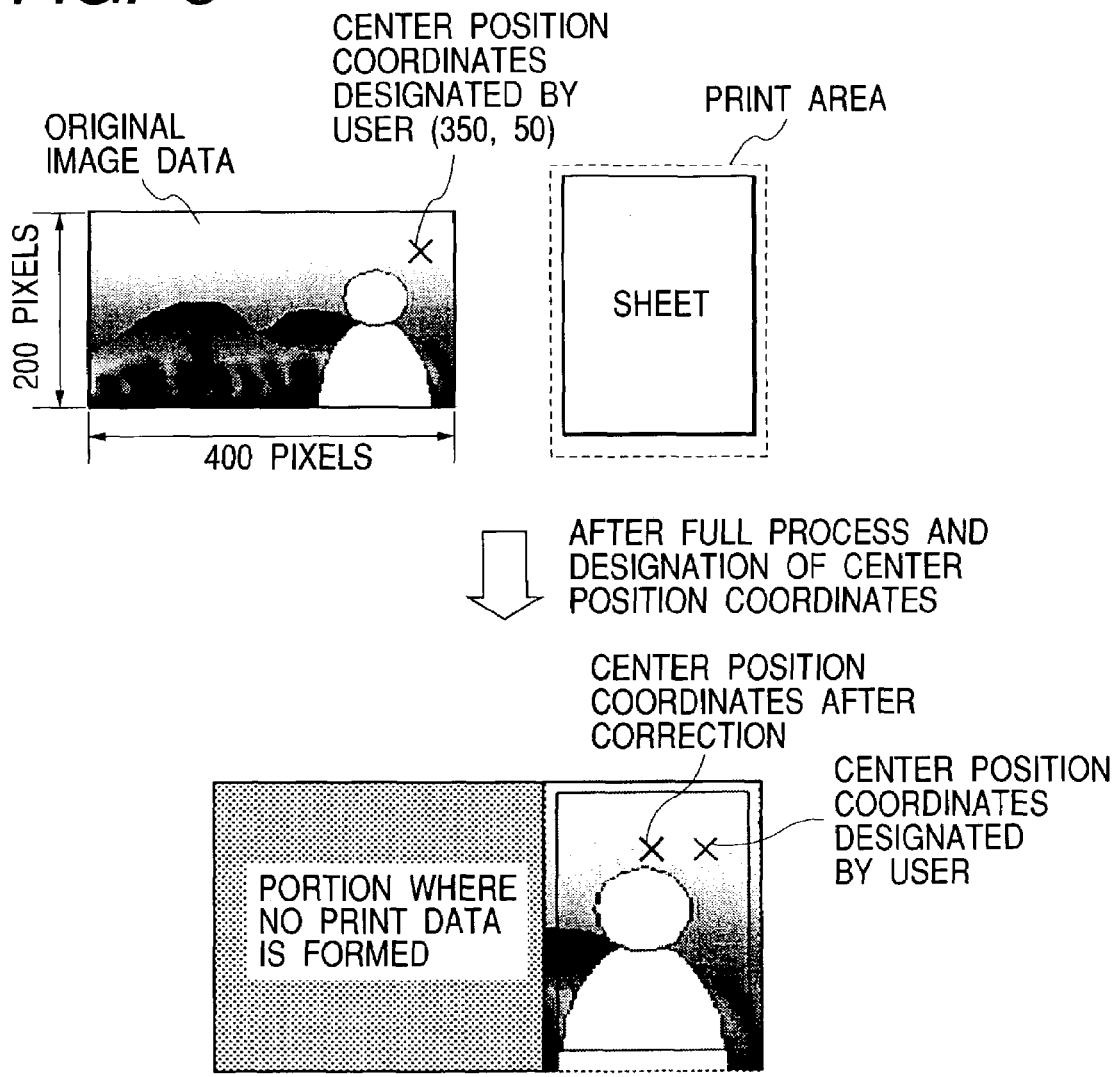
FIG. 8 is a diagram for explaining a case where offset coordinates are corrected because a blank occurs on a sheet.

FIGS. 7 and 8 illustrate the print data which is formed in the case where (200, 50) and (350, 50) are designated as center position coordinates, respectively. When (200, 50) are designated as center position coordinates, even if the designated center position coordinates are applied as they are, no blank occurs as shown in FIG. 7.

Figure 9:
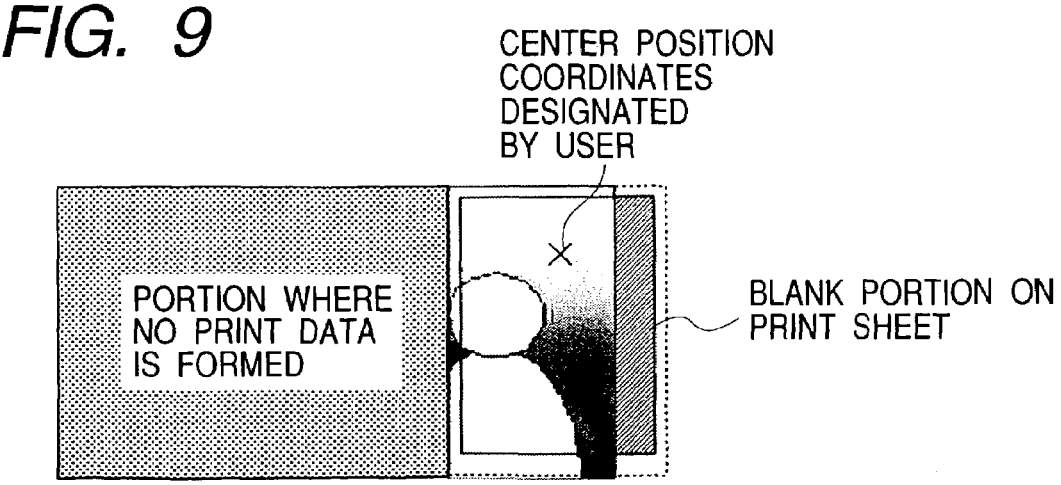
FIG. 9 is a diagram for explaining a reason why the blank occurs when the offset coordinates are not corrected.

When (350, 50) are designated as center position coordinates, if the designated center position coordinates are applied as they are, a blank occurs in the right portion of the sheet as shown in FIG. 9. To cope with such a situation, an offset correcting unit is further provided for the offset calculating unit 130 of the print filter 100. Since the offset correcting unit corrects the designated offset coordinates on the basis of the equation (5), the print data can be formed so as not to cause a blank as shown in FIG. 8.

As mentioned above, by making "Full & center position coordinates designation" upon setting of the borderless printing, a desired borderless printing can be easily realized only by designating the command line options without executing the trimming process such that the portion to be printed is extracted from the image data in accordance with the aspect ratio of the sheet by using the application, tool, or the like.

Although the center position coordinates have been designated by the user on the basis of the number of pixels in the resolution of the original image data in the embodiment, they can be also designated by a ratio to the whole size such as "2/3 from the left edge" instead of the number of pixels.

Although the offset coordinates have been corrected by the offset processing unit of the offset calculating unit 130 so as not to cause a blank, a warning unit is further provided, the user is warned of the occurrence of a blank, and such a warning is displayed. If a mode to make a correction is designated by the user on a warning display screen, the correction is made by the offset correcting unit. If a mode to interrupt the process is designated by the user on the warning display screen, the process is interrupted without automatically correcting the offset coordinates.

Figure 10:
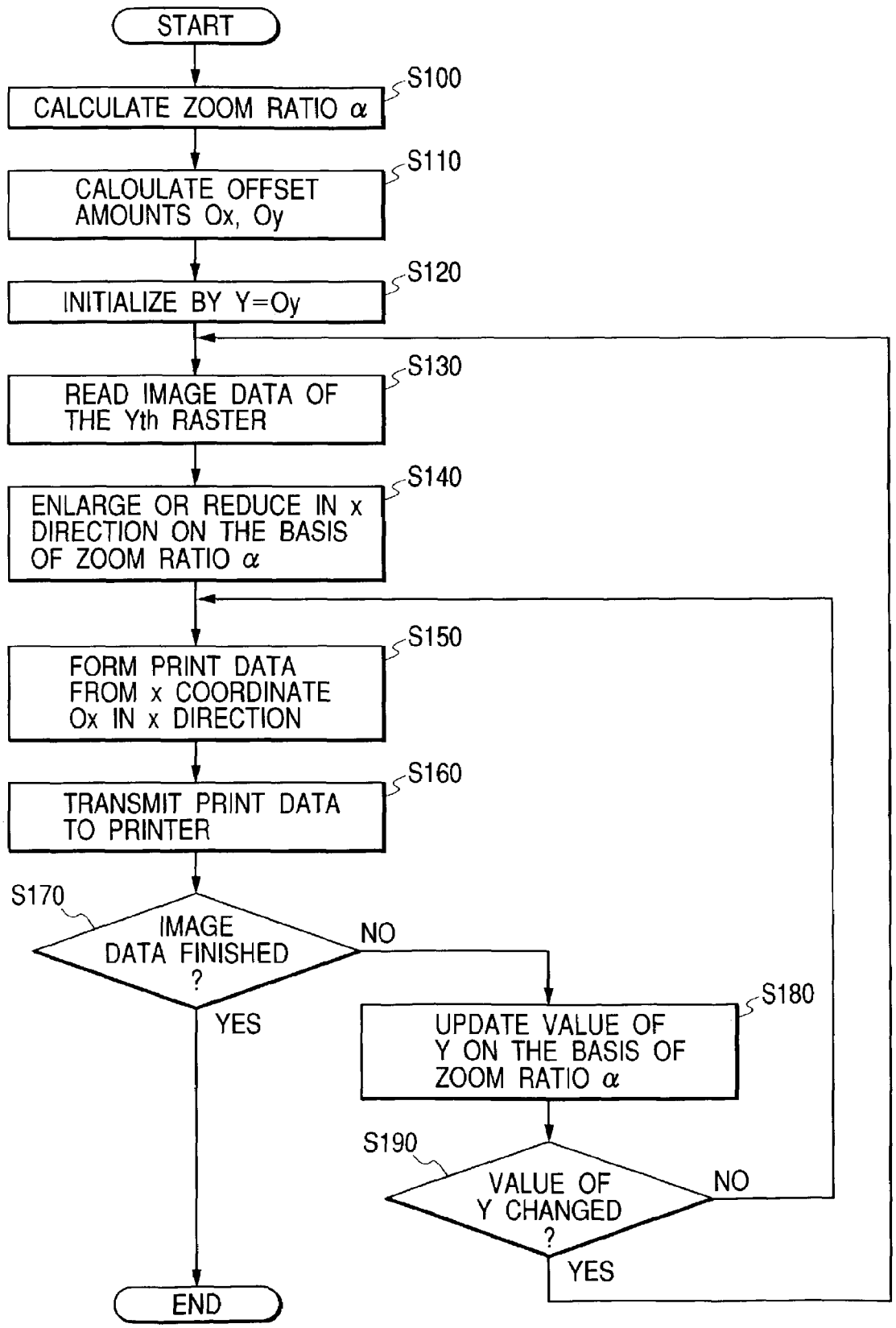
FIG. 10 is a flowchart for explaining a processing flow in the case where print settings of "borderless print designation" and "Full & center position coordinates designation" are designated by the user.

In the flowchart of FIG. 10, although the enlargement/reduction processing unit 120 has been described as a method whereby the zooming process is realized by the simple enlarging or reducing process, naturally, the method of the enlarging/reducing process which is executed in the enlargement/reduction processing unit 120 is not limited to it.

The invention can be applied to a system comprising a plurality of apparatuses (for example, a host computer, an interface device, a reader, a printer, and the like) or to an apparatus comprising one equipment (for example, a copying apparatus, a facsimile apparatus, or the like).

Naturally, the object of the invention is accomplished by a method whereby a memory medium in which program codes of software to realize the functions of the embodiment mentioned above have been recorded is supplied to a system or an apparatus and a computer (or a CPU or an MPU) of the system or apparatus reads out and executes the program codes stored in the memory medium.

In such a case, the program codes themselves read out from the memory medium realize the functions of the embodiment mentioned above and the memory medium in which the program codes have been stored constructs the invention.

As a memory medium to supply the program codes, for example, a floppy disk, a hard disk, an optical disk, a magnetooptic disk, a CD-ROM, a CD-R, a magnetic tape, a non-volatile memory card, an ROM, or the like can be used.

Naturally, the invention incorporates not only a case where a computer executes the read-out program codes, so that the functions of the embodiment mentioned above are realized but also a case where an OS (Operating System) or the like which is operating on the computer executes a part or all of actual processes on the basis of instructions of the program codes and the functions of the embodiment mentioned above are realized by those processes.

Further, naturally, the invention incorporates a case where the program codes read out from the memory medium are written into a memory provided for a function expanding board inserted in a computer or a function expanding unit connected to a computer and, thereafter, a CPU or the like provided for the function expanding board or the function expanding unit executes a part or all of the actual processes on the basis of instructions of the program codes and the functions of the embodiment mentioned above are realized by those processes.

As described above, according to the embodiment of the invention, by making "Full & center position coordinates designation" upon setting of the borderless printing, there is an effect such that the desired borderless printing can be easily realized without executing the trimming process such that the portion to be printed is extracted from the image data in accordance with the aspect ratio of the sheet by using the application, tool, or the like.

As described above, according to the embodiment of the invention, the borderless printing subjected to the trimming process can be executed by simple designation.

What is claimed is:

1. A print data forming apparatus for forming print data to be transmitted to a printer, comprising:
   a designation unit adapted for designating a desired position of an image to be moved to a center position of a print area,
   a size-changing unit adapted for enlarging or reducing the image while holding the aspect ratio of the image such that no blank is formed in the print area; and
   a forming unit adapted for forming print data based on the image enlarged or reduced by the size-changing unit such that a position of the enlarged or reduced image corresponding to the position designated by the designation unit is placed in the center position of the print area.

2. An apparatus according to claim 1, further comprising a correction unit adapted for correcting the position designated by the designation unit if a blank occurs in printing with the designated position.

3. An apparatus according to claim 1, wherein the size changing unit comprises a determination unit adapted for determining an enlargement ratio or a reduction ratio such that a largest trimming area is obtained.

4. An apparatus according to claim 3, further comprising a calculation unit adapted for calculating an offset based on (a) the enlargement ratio or the reduction ratio determined by the determination unit and (b) the position designated by the designation unit, wherein the forming unit forms the print data based on (i) the offset calculated by the calculation unit and (ii) the enlarged or reduced image.

5. A method for a print data forming apparatus for forming print data to be transmitted to a printer, comprising:
   a designation step of designating a desired position of an image to be moved to a center position of a print area,
   a size-changing step of enlarging or reducing the image while holding the aspect ratio of the image such that no blank is formed in the print area; and
   a forming step of forming print data based on the image enlarged or reduced in the size-changing step such that a position of the enlarged or reduced image corresponding to the position designated in the designation step is placed in the center position of the print area.

6. A method according to claim 5, further comprising a correction step of correcting the position designated by the designation unit if a blank occurs in printing with the designated position.

7. A method according to claim 5, wherein the size-changing step comprises a determination step of determining an enlargement ratio or a reduction ratio such that a largest trimming area is obtained.

8. A method according to claim 7, further comprising a calculation step of calculating an offset based on (a) the enlargement ratio or the reduction ratio determined in the determination step and (b) the position designated in the designation step, wherein the forming step forms the print data based on (i) the offset calculated in the calculation step and (ii) the enlarged or reduced image.

9. A computer-readable storage medium storing a computer-executable program for a print data forming apparatus for forming print data to be transmitted to a printer, the computer-executable program comprising:
   a designation step of designating a desired position of an image to be moved to a center position of a print area,
   a size-changing step of enlarging or reducing the image while holding the aspect ratio of the image such that no blank is formed in the print area; and
   a forming step of forming print data based on the image enlarged or reduced in the size-changing step such that a position of the enlarged or reduced image corresponding to the position designated in the designation step is placed in the center position of the print area.

10. A computer-readable storage medium according to claim 9, the computer-executable program further comprising a correction step of correcting the position designated in the designation step if a blank occurs in printing with the designated position.

11. A computer-readable storage medium according to claim 9, wherein the size-changing step comprises a determination step of determining an enlargement ratio or a reduction ratio such that a largest trimming area is obtained.

12. A computer-readable storage medium according to claim 11, the computer-executable program further comprising a calculation step of calculating an offset based on (a) the enlargement ratio or the reduction ratio determined in the determination step and (b) the position designated in the designation step, wherein the forming step forms the print data based on (i) the offset calculated in the calculation step and (ii) the enlarged or reduced image.

* * * * *